US012180912B2

(12) United States Patent
Pikovsky et al.

(10) Patent No.: US 12,180,912 B2
(45) Date of Patent: Dec. 31, 2024

(54) TURBINE ENGINE COMPRISING A HEAT EXCHANGER CONSISTING OF AT LEAST ONE DECK BETWEEN VANES

(71) Applicant: SAFRAN AIRCRAFT ENGINES, Paris (FR)

(72) Inventors: Catherine Pikovsky, Moissy-Cramayel (FR); Christophe Marcel Lucien Perdrigeon, Moissy-Cramayel (FR); Cedric Zaccardi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/970,841

(22) PCT Filed: Feb. 18, 2019

(86) PCT No.: PCT/FR2019/050357
§ 371 (c)(1),
(2) Date: Aug. 18, 2020

(87) PCT Pub. No.: WO2019/162600
PCT Pub. Date: Aug. 29, 2019

(65) Prior Publication Data
US 2021/0095618 A1  Apr. 1, 2021

(30) Foreign Application Priority Data

Feb. 23, 2018 (FR) ........................ 1851623

(51) Int. Cl.
*F02K 3/06* (2006.01)
*F02C 6/08* (2006.01)
*F02C 7/36* (2006.01)

(52) U.S. Cl.
CPC ............... *F02K 3/06* (2013.01); *F02C 6/08* (2013.01); *F02C 7/36* (2013.01);
(Continued)

(58) Field of Classification Search
CPC ........ F02C 7/18; F02C 6/08; F02C 7/14–143; F02C 7/16–185; F02K 3/115;
(Continued)

(56) References Cited

U.S. PATENT DOCUMENTS 7,377,100 B2 * 5/2008 Bruno ............... F02K 3/115
60/39.08
8,387,362 B2 * 3/2013 Storage ............. F02K 3/115
60/266

(Continued)

FOREIGN PATENT DOCUMENTS

| EP | 0 127 562 A2 | 12/1984 |
| EP | 2 697 741 A1 | 10/2010 |
| EP | 2 762 685 A1 | 8/2014 |

OTHER PUBLICATIONS

U.S. Appl. No. 16/483,526, filed Aug. 5, 2019, US 2020/0032664, Beaujard, et al.
(Continued)

*Primary Examiner* — Jason H Duger
(74) *Attorney, Agent, or Firm* — Oblon, McClelland, Maier & Neustadt, L.L.P.

(57) ABSTRACT

An aircraft turbine engine having a primary air flow path with a low-pressure and a high-pressure compressors, a secondary air flow path with vanes and decks between vanes, each of the decks being located between the inner radial ends or between the outer radial ends of two adjacent vanes, each deck having a wall partially delimiting the secondary path. A pressurized air circuit draws air between the low-pressure compressor and the high-pressure com-
(Continued)

pressor or in the high-pressure compressor and supplies at least one turbine engine component located near a main axis of the turbine engine. The pressurized air circuit includes a heat exchanger between the pressurized-air stream and the air stream flowing in the secondary path. The heat exchanger is formed by at least one deck through which the pressurized air flows, the wall of the deck performing the heat transfer between the pressurized air and the air stream flowing in the secondary path.

7 Claims, 3 Drawing Sheets

(52) U.S. Cl.
CPC .... *F05D 2220/323* (2013.01); *F05D 2240/12* (2013.01); *F05D 2260/213* (2013.01); *F05D 2260/98* (2013.01)

(58) Field of Classification Search
CPC ....... F05D 2260/213; F01D 5/081–087; F16H 57/0416
See application file for complete search history.

(56) References Cited

U.S. PATENT DOCUMENTS

| | | | | |
|---|---|---|---|---|
| 8,910,465 | B2* | 12/2014 | Snyder | F02K 3/115 60/266 |
| 9,234,463 | B2* | 1/2016 | Benjamin | F02C 7/12 |
| 9,957,895 | B2* | 5/2018 | Suciu | F01D 25/12 |
| 10,731,563 | B2* | 8/2020 | Munsell | F02C 7/185 |
| 10,837,364 | B2* | 11/2020 | Roberge | F02C 7/36 |
| 2009/0317238 | A1* | 12/2009 | Wood | F01D 25/162 415/119 |
| 2013/0192253 | A1 | 8/2013 | Ackermann et al. | |
| 2014/0209286 | A1* | 7/2014 | Freund | F01P 3/12 165/168 |
| 2016/0138478 | A1* | 5/2016 | Negulescu | F02C 7/18 415/122.1 |
| 2018/0058472 | A1* | 3/2018 | Tajiri | F28F 13/06 |
| 2018/0238238 | A1* | 8/2018 | Luschek | F28F 1/26 |
| 2018/0281048 | A1* | 10/2018 | Yang | F02C 9/18 |
| 2020/0049028 | A1* | 2/2020 | Oriol | F02C 7/047 |

OTHER PUBLICATIONS

U.S. Appl. No. 16/665,037, filed Oct. 28, 2019, US 2020/0131934, Pikovsky, et al.
U.S. Appl. No. 16/809,637, filed Mar. 5, 2020, Zaccardi, et al.
U.S. Appl. No. 16/462,264, filed May 20, 2019, US 2019/0338661, Zaccardi, et al.
U.S. Appl. No. 16/270,771, filed Feb. 8, 2019, US 2019/0249558, Zaccardi, et al.
U.S. Appl. No. 16/126,028, filed Sep. 10, 2018, US 2019/0078452, Zaccardi, et al.
U.S. Appl. No. 15/653,976, filed Jul. 19, 2017, US 2018/0023406, Zaccardi, et al.
International Search Report issued Jun. 7, 2019 in PCT/FR2019/050357 filed Feb. 18, 2019, 2 pages.

* cited by examiner

TURBINE ENGINE COMPRISING A HEAT EXCHANGER CONSISTING OF AT LEAST ONE DECK BETWEEN VANES

TECHNICAL FIELD

The invention relates to a turbomachine, such as an aircraft turbomachine comprising means of cooling a component located in the proximity of a principal axis of the turbomachine.

The invention more particularly relates to a turbomachine comprising means of cooling a low pressure rotating shaft and/or lubrication oil pressurisation chambers.

STATE OF PRIOR ART

In existing turbomachines, there are many engine internal air circuits. These circuits perform different functions.

Among these circuits, one air circuit performs the lubrication oil chamber pressurisation function to prevent oil from escaping from these chambers, and also the low pressure shaft cooling function.

Air from this circuit is drawn off in the inter-flow streams compartment, downstream from the low pressure compressor, preferably between the low pressure compressor and the high pressure compressor.

This air is then evacuated through the deoilers for air passing through the chambers, and downstream from the low pressure turbine for other air.

This circuit will be affected by head losses due to changes in radii, holes, seals, etc. Therefore the pressure ratio (drawn off pressure/outlet pressure) must be large enough for air to circulate satisfactorily with the required flow rate.

One of the constraints on this air circuit is that the air temperature must be low enough to cool the low pressure shaft and to avoid excessively heating oil in the chambers. The air pressure must be sufficient so that the pressure mentioned above is high enough and enables the specified flow to circulate.

Also in some turbomachines, the thermodynamic cycle is such that the pressure ratio is too low for this circuit to perform these functions. Therefore, an alternative solution must be found.

The purpose of the invention is to disclose a turbomachine comprising means of efficiently cooling the circuit carrying air drawn off downstream from the low pressure compressor, while creating low head losses.

PRESENTATION OF THE INVENTION

The invention relates to an aircraft turbomachine comprising a core engine air flow stream passing through a low pressure compressor and a high pressure compressor,
  a fan air flow stream that is located around the core engine flow stream and coaxially with the core engine flow stream, comprising an air flow straightener acting on air passing in the fan flow stream, comprising a plurality of vanes distributed around a principal axis A of the turbomachine and that comprises decks between vanes, each of which is located between the internal radial ends or between the external radial ends of two adjacent vanes, each deck comprising a wall partly delimiting the fan flow stream,
  a pressurised air circuit that draws off air between the low pressure compressor and the high pressure compressor or in the high pressure compressor, to produce a pressurised air flow that supplies at least one component of the turbomachine, said at least one component being radially located in the turbomachine closer to a principal axis A of the turbomachine than the core engine flow stream,
  wherein the pressurised air circuit comprises a heat exchanger between the pressurised air flow and the air flow passing through the fan flow stream,
  characterised in that the heat exchanger is formed from at least one deck through which the pressurised air flow passes, said wall of the deck making the heat exchange between the pressurised air flow and the air flow passing in the fan flow stream.

Preferably, the deck comprises a conduit in which the pressurised air flows that is in thermal contact with the wall of the deck by welding.

Preferably, the conduit is composed of a single piece with at least part of the deck. Preferably the conduit consists of an add-on element that is fixed to the wall of the deck.

Preferably, the deck comprises a pressurised air inlet port located at an upstream end of the deck and a pressurised air outlet port located at a downstream end of the deck, along the air flow direction in the fan flow stream.

Preferably, the deck comprises a pressurised air inlet port located at a downstream end of the deck and a pressurised air outlet port located at an upstream end of the deck, along the air flow direction in the fan flow stream.

Preferably, the deck is made of a heat conducting material.

Preferably, the turbomachine comprises an inter-flow stream compartment located between the core engine flow stream and the fan flow stream, and the pressurised air circuit comprises the following, along the direction of air flow in this circuit:
  at least one air drawing off point supported by a radially internal wall of the inter-flow stream compartment;
  an upstream segment extending through the inter-flow stream compartment as far as the fan flow stream;
  said at least one deck;
  a downstream segment extending through the inter-flow stream compartment from the fan flow stream to the core engine flow stream and extending through a profiled arm passing through the core engine flow stream;
  means of distribution of pressurised air to said at least one component of the turbomachine.

Preferably, said at least one component of the turbomachine is a low pressure shaft of the turbomachine.

Preferably, said at least one component is a lubrication oil pressurisation chamber.

Preferably, said at least one component is a speed reducer located between the low pressure shaft and a fan of the turbomachine.

BRIEF DESCRIPTION OF THE DRAWINGS

Other characteristics and advantages of the invention will become clear after reading the following detailed description, that will be better understood by referring to the appended figures among which.

DETAILED PRESENTATION OF PARTICULAR EMBODIMENTS

Figure 1:
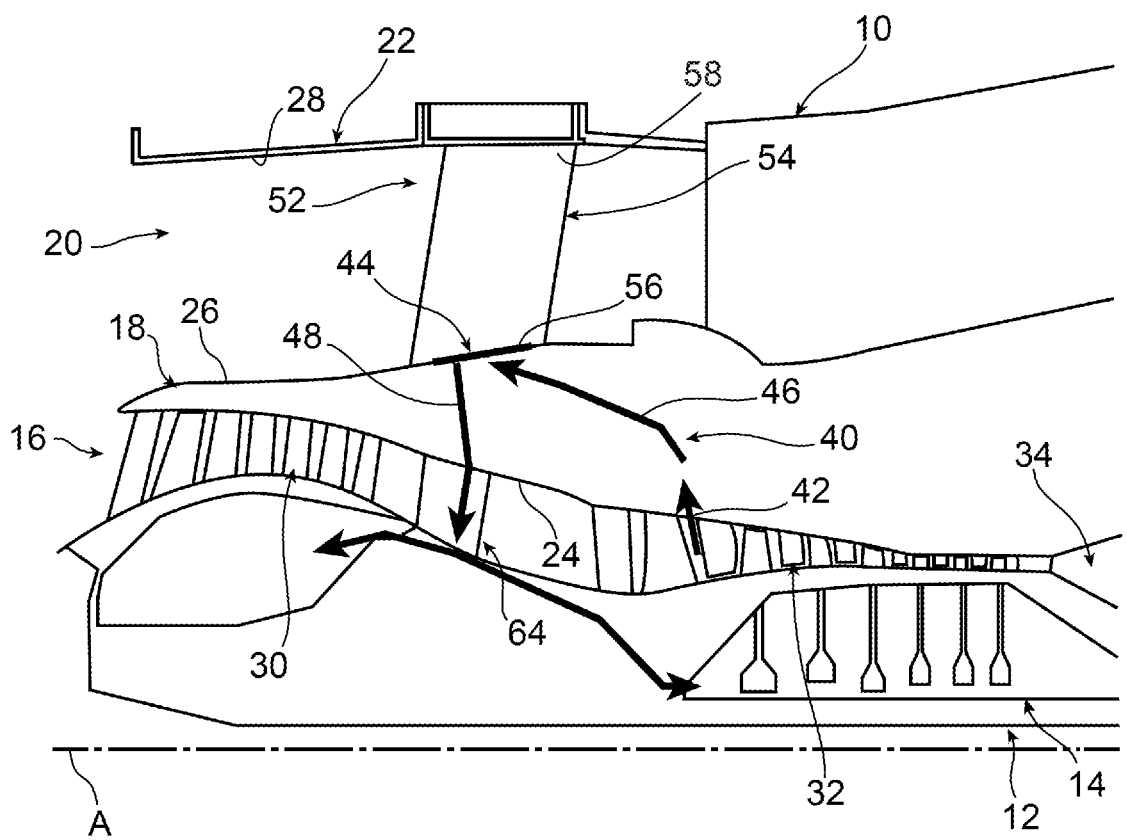
FIG. 1 is a diagrammatic axial sectional representation of an aircraft turbomachine comprising a pressurised air circuit made according to the invention.

FIG. 1 represents an aircraft turbomachine 10.

The turbomachine 10 comprises, in order of distance from its principal axis A, a low pressure shaft 12, a high pressure shaft 14, a core engine air flow stream 16, a fan air flow stream 20, an inter-flow stream compartment 18 separating the core engine flow stream 16 and the fan flow stream 20 and an intermediate case shell 22.

The inter-flow stream compartment 18, also called the "core compartment", is radially delimited by a radially internal wall 24 delimiting the exterior of the core engine flow stream 16 and a radially external wall 26 delimiting the interior of the fan flow stream 20. The shell 22 comprises a radially internal wall 28 delimiting the exterior of the fan flow stream 20.

The core engine flow 16 comprises, in order from upstream to downstream along the air flow direction, in other words from left to right with reference to FIG. 1, a low pressure compressor 30, a high pressure compressor 32, a combustion chamber 34, a high pressure turbine and a low pressure turbine (not represented).

The fan flow stream 20 comprises a straightener 52 that is intended to redirect the air flow in the fan flow stream 20 so that it flows along the axial direction.

The straightener 52 comprises a plurality of vanes 54 distributed uniformly around the principal axis A of the turbomachine 10 that act on the air flow circulating in the fan flow stream 20 to redirect the air flow along the principal axis of the turbomachine 10.

Each vane 54 extends principally radially from the principal axis A and comprises a radially internal radial root end 56 to connect it to the inter-flow stream compartment 18 and a radially external radial tip end 58 to connect it to the shell 22.

Each of the radially external wall 26 of the inter-flow stream compartment 18 and the radially internal wall 28 of the shell 22 comprises a connecting zone (not represented) at which the vanes 54 are connected, which may for example be a radial boss.

Figure 2:
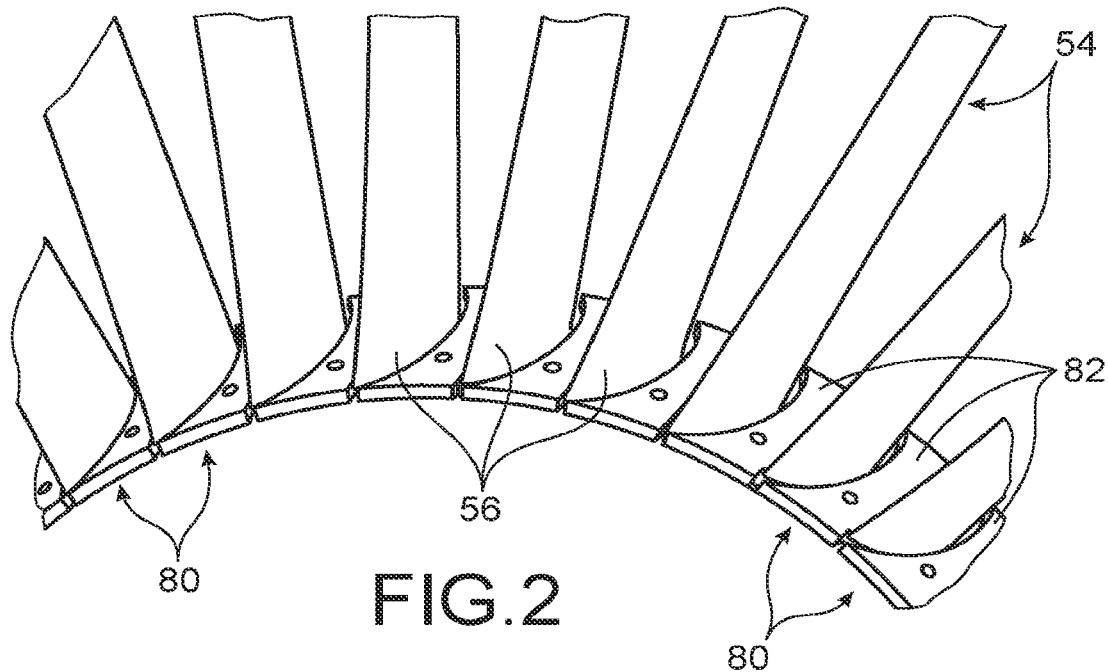
FIG. 2 is a larger scale detailed perspective view of a part of the straightener showing the layout of the inter-vane decks arranged at the hub of the turbomachine.

As can be seen for example in FIG. 2, decks 80 are arranged between the roots 56 of adjacent vanes 54. Each of these decks 80 comprises a wall 82 that forms a ring sector coaxial with the principal axis. The set of walls 82 of the decks 80 forms a ring that prolongs the radially external wall 26 of the inter-flow stream compartment 18, at the connecting zone.

Also, similar decks (not shown) are arranged between the heads 58 of the vanes 54, each of these decks comprises a wall that forms a ring sector coaxial with the principal axis A, to prolong the radially internal wall 28 internal to the shell 22, at the connection zone.

Thus, the wall 82 of each deck 80 partly delimits the fan flow stream 20.

Each deck 80 also comprises means of solidarisation to the inter-flow stream compartment 18 or to the shell 22. Such solidarisation means are for example attachment pads 89 mounted on an internal face 60 of the wall 82 of the deck 80, as shown on FIG. 4.

The turbomachine 10 also comprises air circuits distributed inside the turbomachine to cool several components of the turbomachine 10.

Among these circuits, as can be seen on FIG. 1, the turbomachine 10 comprises a pressurised air circuit 40 designed to cool the low pressure shaft 1 and to supply pressurised air to the chambers containing lubrication oil for mobile parts, that are for example located at the low pressure shaft 12.

This pressurised air can also supply a speed reducer (not represented) located between the low pressure shaft 12 and the turbomachine fan.

The speed reducer will dissociate the rotation speed of the fan from the rotation speed of the low pressure shaft 12 that drives the fan. In particular, this reduces the rotation speed of the vanes of the fan relative to the rotation speed of the vanes of the low pressure compressors, and thus optimises the efficiency of each and therefore improves the output propulsion. Such a reducer is particularly advantageous in the case of a turbojet with a high dilution rate, in other words for which the ratio between the quantity of air flow flowing in the secondary flow stream.

A high dilution rate can reduce engine consumption, but leads to large fan dimensions. The rotation speed of the fan is then limited, correspondingly restricting the rotation speed of the low pressure compressor and the low pressure turbine.

This pressurised air circuit 40 comprises at least one air drawing off point 42 located on the radially internal wall of the inter-flow stream compartment 18. This drawing off point 42 is located between the low pressure compressor 30 and the high pressure compressor 32, or in the high pressure compressor 32.

In the latter case, the air drawing off point 42 is located at one of the stages of the high pressure compressor 32 that is determined as a function of the pressure of the pressurised air, its temperature and the possibility of drawing off on the first stages of the high pressure compressors 32 despite the presence of variable stator vanes (VSV).

The pressure of the drawn off air is sufficiently high to pressurise the oil chambers. However, the temperature of this air is too high to cool the low pressure shaft 12 and also to have good operating conditions for the lubrication circuit.

The pressurised air circuit 40 comprises a heat exchanger 44 for this purpose that reduces the temperature of the pressurised air.

This heat exchanger 44 is of the air-air type and the cold air source consists of air circulating in the fan flow stream 20.

The heat exchanger 44 is thus located in the fan flow stream 20, as will be described in the following.

The pressurised air circuit 40 comprises, in the direction of the air flow in the circuit, an upstream segment 46 that extends from the air drawing off point 42 as far as the heat exchanger 44, the heat exchanger 44, a downstream segment 48 that extends from the heat exchanger 44 to the low pressure shaft 12 and means (not represented) of distributing pressurised air towards cooling points of the low pressure shaft 12 and oil pressurisation chambers.

Thus, the upstream segment 46 of the pressurised air circuit 40 extends through the inter-flow stream compartment 18, from its radially internal wall 24 at which the upstream segment 46 is connected to the air drawing off point 42, as far as the radially external wall 26 of the inter-flow stream compartment 18, at which it is connected to the heat exchanger 44.

Also, the downstream segment 48 of the pressurised air circuit extends through the inter-flow stream compartment 18, starting from its radially external wall at which it is connected to the heat exchanger 44 and it also passes through the core engine flow stream 16 in profiled arms 64 advantageously positioned between the low pressure compressor 30 and the high pressure compressor 32.

As mentioned above, the cold air source of the heat exchanger 44 is composed of air circulating in the fan flow stream 20.

Figure 3:
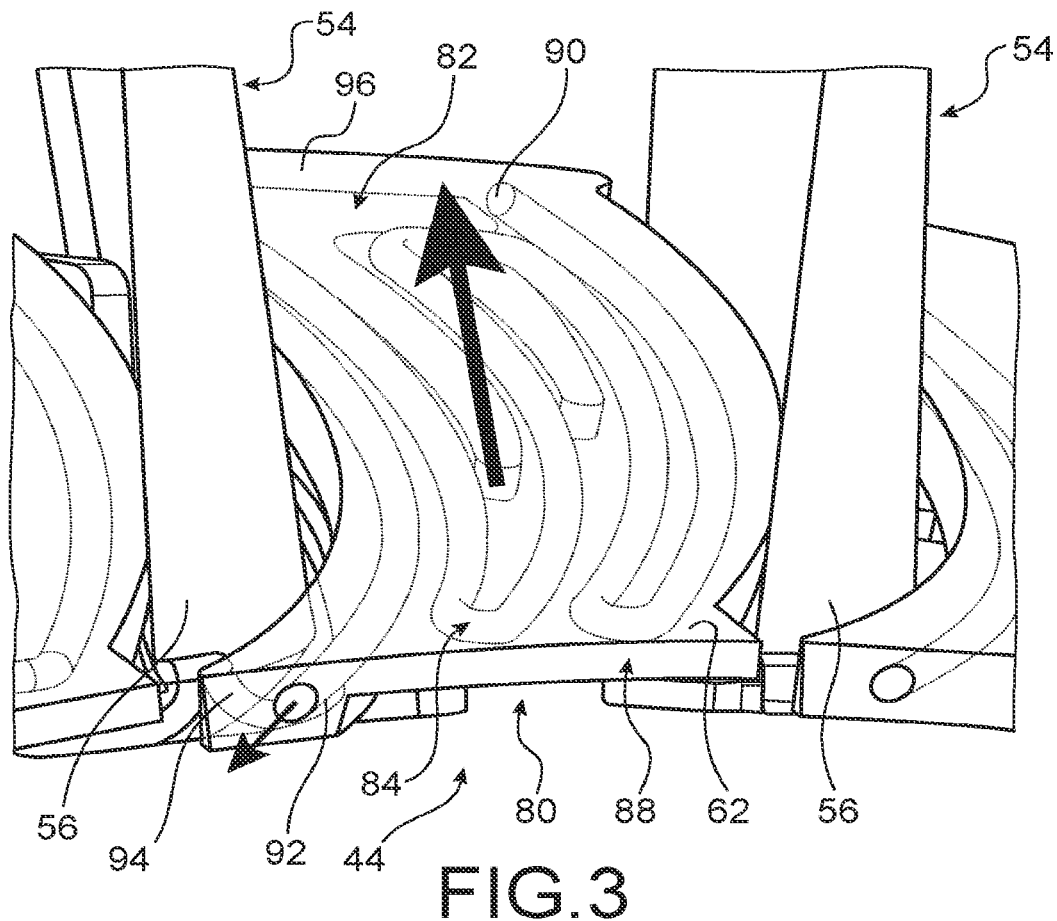
FIG. 3 is a larger scale detailed representation of a deck shown in FIG. 2, comprising a pressurised air flow circulation duct.
Figure 4:
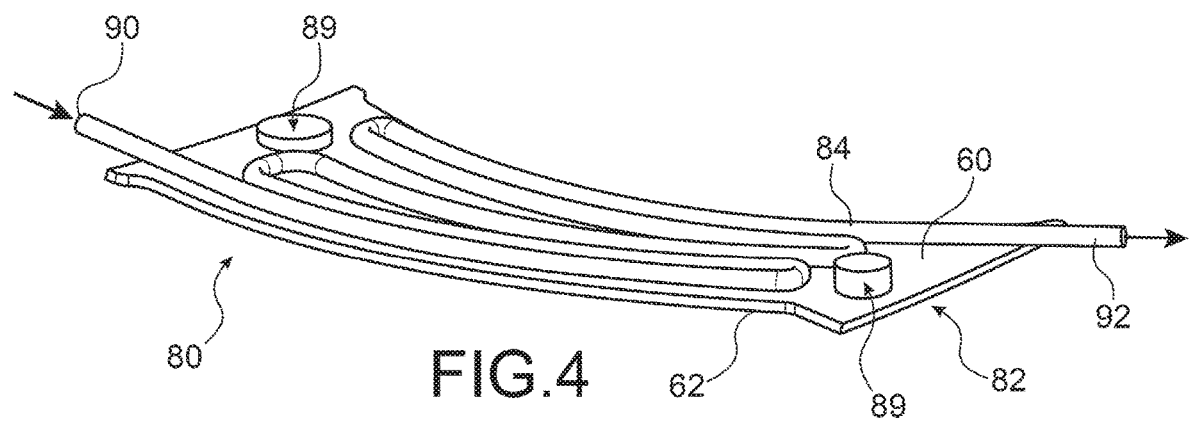
FIG. 4 is a view showing a method of solidarising the conduit to a body of the deck.
Figure 5:
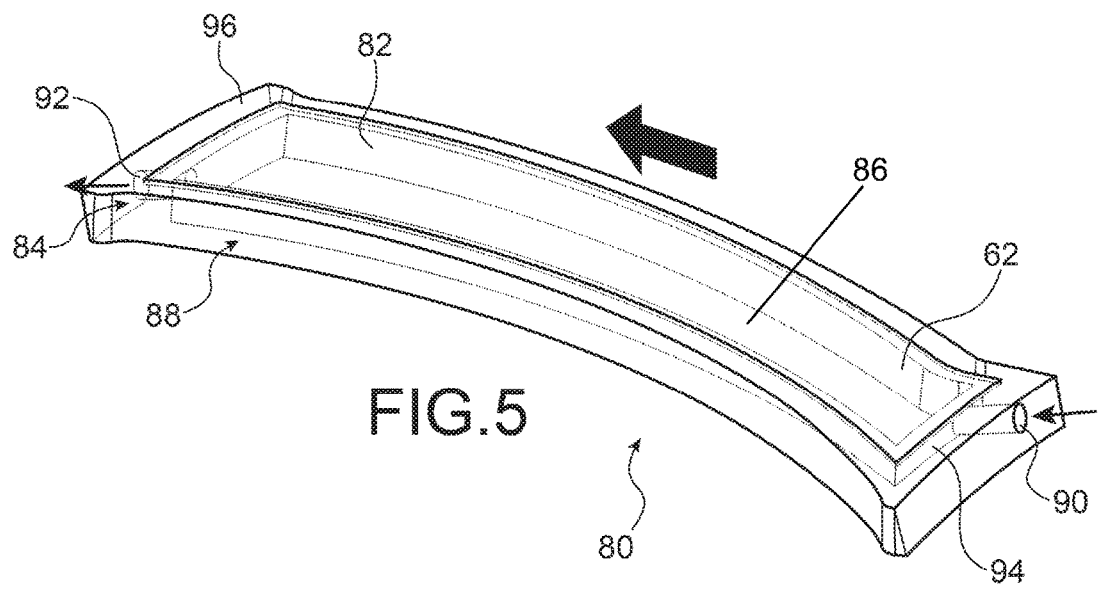
FIG. 5 is a representation of another embodiment of the deck comprising a cavity and an add-on plate.

As can be seen in FIGS. 3 to 5, the heat exchanger 44 is composed of at least one deck 80, through which the pressurised air flows, to exchange heat with air flowing in the fan flow stream 20.

According to one embodiment, the heat exchanger 44 is composed of a single deck 80. According to another embodiment, the heat exchanger is composed of a plurality of decks 80 that are adjacent to each other.

In the following description, reference will be made to one deck 80. It will be understood that this description is applicable for the first embodiment according to which the heat exchanger 44 comprises a single deck 80, and also the embodiment according to which the heat exchanger comprises several decks 80, the description of each of the decks 80 composing the heat exchanger 44 being deduced from this description.

Also, in the following description, a deck 80 located between the roots 56 of two adjacent vanes 54 will be described, it will be understood that this description can also be applied to a heat exchanger comprising at least one deck located between the tips 58 of two adjacent vanes 54.

The wall 82 of the deck 80, that partly delimits the fan flow stream 20, is in direct contact with cold air circulating in the fan flow stream 20.

The deck 80 comprises a conduit 84 formed in its internal volume, that is in thermal contact with the wall 82 and through which the pressurised air flows.

The wall 82 of the deck 80 then makes a heat exchange between the pressurised air and air flowing in the secondary flow stream 20.

According to a first embodiment that can be seen on FIGS. 3 and 4, the conduit 84 is tubular in shape and is arranged inside the deck 80, for example forming a coil.

According to a first aspect of this first embodiment and as can be seen on FIG. 4, the conduit 84 is solidarised to the wall 82 of the deck 80 by welding and heat exchange can take place by contact between the conduit and the wall 82.

According to this first aspect, the deck 80 is formed solely by the wall 82 that supports the conduit 84 on its internal face 60 opposite the face 62 forming the fan flow stream. Thermal conduction means such as a thermal paste can be inserted between the wall 82 of the deck 80 and the conduit 84 to facilitate heat exchange between the two elements.

According to a second aspect of this first embodiment, and as can be seen on FIG. 3, the conduit 84 and the wall 82 of the deck 80 are a single part.

To achieve this, the deck 80 is formed during manufacturing of the deck 80. For example, the deck 80 and the conduit 84 are formed simultaneously during a moulding or additive manufacturing operation.

According to one variant embodiment, the deck 80 is made from a single piece, by moulding or by additive manufacturing and the conduit 84 is then formed in the deck 80 by removal of material, for example by machining the deck 80.

According to a second embodiment represented on FIG. 5, the conduit 84 comprises a cavity 86 formed in the deck 80. This cavity 86 delimits a large volume facilitating heat exchanges between the pressurised air flow and the air flow in the fan flow stream.

According to a first aspect of this second embodiment, the deck 80 is made in two parts, and comprises a body 88 onto which the wall 82 is added.

The cavity 86 is located in the body 88 of the deck 80. The cavity 86 is open in one face of the body 88 oriented radially towards the fan flow stream 20 and the opening formed is closed off by the wall 82 of the deck 80, so that the pressurised air flow can make direct thermal contact with the wall 82.

According to a second aspect of this second embodiment, the deck 80 is made in a single piece, in which the cavity 86 is formed. Preferably, such a deck 80 is made by additive manufacturing.

Regardless of the embodiment used for the conduit 84, the deck 80 comprises an inlet port 90 through which the pressurised air flow enters into the conduit 84 and an outlet port 92 through which the cooled pressurised air flow leaves the conduit 84.

Each inlet port 90 and outlet port 92 is located at either the upstream axial end 94 of the deck 80 or the downstream axial end 96 of the deck 80.

It will be understood that herein, the upstream axial end 94 of the deck 80 is the axial end of the deck 80 located upstream from the deck 80 along the direction of flow of the air flow in the fan flow stream, in other words the axial end at the left in FIG. 1, and the downstream axial end 96 of the deck 80 is the axial end of the deck 80 located downstream from the deck 80 along the direction of flow of the air flow in the fan flow stream, in other words the axial end at the right in FIG. 1.

According to a first example represented for example in FIG. 5, the inlet port 90 is located at the upstream end 94 of the deck 80 and the outlet port 92 is located at the downstream end 96 of the deck 80.

According to a second example represented in FIG. 3, the inlet port 90 is located at the downstream end 96 of the deck 80 and the outlet port 92 is located at the upstream end 94 of the deck 80.

According to this second example, the direction of the pressurised air flow in the deck 80 is opposite to the direction of the air flow in the fan flow stream. Efficiency of the heat exchange is then improved.

The role of the deck 80 is principally aerodynamic, to reconstitute the air flow stream 20 so as to limit disturbances in the air flow passing through it, at the tips and the roots of the vanes 54.

Thus, the deck 80 does not have a structural role for which there are constraints on its design relative to the forces that will be applied to the deck 80.

Consequently, the deck 80 can be made from material without any particular mechanical strength properties, but that has properties optimised for heat exchange between the pressurised air flow and the air flow in the fan flow stream 20.

This material is preferably a good thermal conductor, for example such as aluminium, that is also a lightweight material.

The invention claimed is:

1. An aircraft turbomachine comprising:
   a core engine air flow stream passing through a low pressure compressor and a high pressure compressor;
   a fan air flow stream is located around the core engine air flow stream and coaxially with the core engine air flow stream;

an inter-flow stream compartment located between the core engine air flow stream and the fan air flow stream;

an air flow straightener acting on air passing in the fan air flow stream, the air flow straightener comprising a plurality of vanes distributed around a principal axis of the turbomachine, and decks between the plurality of vanes, each of the decks is located between respective internal radial ends of two adjacent vanes of the plurality of vanes, wherein each of the decks is separate and distant from the two adjacent vanes between which the deck is located and comprises a wall partly delimiting the fan air flow stream, and wherein a set of walls of the decks extends a radially external wall of the inter-flow stream compartment at a connecting zone at which the plurality of vanes are connected; and a pressurized air circuit draws off air between the low pressure compressor and the high pressure compressor or in the high pressure compressor, to produce a pressurized air flow that supplies at least one component of the turbomachine, said at least one component being radially located in the turbomachine closer to the principal axis of the turbomachine than the core engine air flow stream, wherein the pressurized air circuit comprises a heat exchanger between the pressurized air flow and air flow passing through the fan air flow stream, wherein the heat exchanger is formed from at least one of the decks, through which the pressurized air flow passes, said respective wall of the at least one of the decks exchanging heat between the pressurized air flow and the air flow passing in the fan air flow stream, and wherein the at least one of the decks forming the heat exchanger comprises a respective conduit in which the pressurized air flows, the respective conduit being tubular in shape and forming a coil presenting a plurality of bends, an air inlet port of the respective conduit being disposed at a first end of the at least one of the decks and an air outlet port of the respective conduit being disposed at a second end of the at least one of the decks, the respective conduit being secured to a radially internal face of the respective wall of the at least one of the decks by welding.

2. The turbomachine according to claim 1, wherein the air inlet port is located at a respective downstream end of the at least one of the decks and the air outlet port is located at a respective upstream end of the at least one of the decks, along an air flow direction in the fan air flow stream.

3. The turbomachine according to claim 1, wherein the at least one of the decks is made of a heat conducting material.

4. The turbomachine according to claim 1,
wherein the pressurized air circuit comprises the following, in a direction of the pressurized air flow in the pressurized air circuit:
at least one air drawing off point supported by a radially internal wall of the inter-flow stream compartment;
an upstream segment extending through the inter-flow stream compartment as far as the fan air flow stream;
said at least one of the decks; and
a downstream segment extending through the inter-flow stream compartment from the fan air flow stream to the core engine air flow stream and extending through a profiled arm passing through the core engine air flow stream.

5. The turbomachine according to claim 1, wherein said at least one component of the turbomachine includes a low pressure shaft of the turbomachine.

6. The turbomachine according to claim 4, wherein the decks are arranged between roots of the plurality of vanes disposed at the internal radial ends of the vanes.

7. The turbomachine according to claim 1, wherein a thermal paste is inserted between the conduit and the respective wall of the at least one of the decks.

* * * * *